United States Patent
Mcgrew et al.

(10) Patent No.: US 11,611,579 B2
(45) Date of Patent: *Mar. 21, 2023

(54) IDENTIFYING AND USING DNS CONTEXTUAL FLOWS

(71) Applicant: Cisco Technology, Inc., San Jose, CA (US)

(72) Inventors: David Mcgrew, Poolesville, MD (US); Blake Harrell Anderson, Chapel Hill, NC (US); Daniel G. Wing, San Jose, CA (US); Flemming Andreasen, Marlboro, NJ (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/715,284

(22) Filed: Apr. 7, 2022

(65) Prior Publication Data

US 2022/0232034 A1  Jul. 21, 2022

Related U.S. Application Data

(63) Continuation of application No. 17/696,081, filed on Mar. 16, 2022, which is a continuation of application
(Continued)

(51) Int. Cl.
*H04L 9/40* (2022.01)
*H04L 61/4511* (2022.01)

(52) U.S. Cl.
CPC ...... *H04L 63/1441* (2013.01); *H04L 61/4511* (2022.05); *H04L 63/145* (2013.01);
(Continued)

(58) Field of Classification Search
CPC ............. H04L 63/1441; H04L 61/4511; H04L 63/1408; H04L 63/145; H04L 63/1416;
(Continued)

(56) References Cited

U.S. PATENT DOCUMENTS 8,171,467 B1   5/2012   Li et al.
8,341,724 B1   12/2012  Burns et al.
(Continued)

OTHER PUBLICATIONS

Patel, Rakhi "A Review on Detecting APT Malware Infections Based on Traffic Analysis and DNS", International Journal of Trend in Research and Development, vol. 2(5), ISSN 2394-9333, Sep.-Oct. 2015, pp. 149-153, IJTRD.

(Continued)

*Primary Examiner* — Shanto Abedin
(74) *Attorney, Agent, or Firm* — Behmke Innovation Group LLC; James M. Behmke; Jonathon P. Western

(57) ABSTRACT

In one embodiment, a device in a network captures domain name system (DNS) response data from a DNS response sent by a DNS service to a client in the network. The device captures session data for an encrypted session of the client. The device makes a determination that the encrypted session is malicious by using the captured DNS response data and the captured session data as input to a machine learning-based or rule-based classifier. The device performs a mediation action in response to the determination that the encrypted session is malicious.

20 Claims, 7 Drawing Sheets

Related U.S. Application Data

No. 16/669,831, filed on Oct. 31, 2019, now Pat. No. 11,303,664, which is a continuation of application No. 15/285,805, filed on Oct. 5, 2016, now Pat. No. 10,505,970.

(52) U.S. Cl.
CPC ...... *H04L 63/1408* (2013.01); *H04L 63/0428* (2013.01); *H04L 63/166* (2013.01)

(58) Field of Classification Search
CPC .................. H04L 63/1433; H04L 63/0428; H04L 63/166
See application file for complete search history.

(56) References Cited

U.S. PATENT DOCUMENTS

| | | | |
|---|---|---|---|
| 8,347,394 B1 | 1/2013 | Lee | |
| 8,402,543 B1* | 3/2013 | Ranjan | H04L 63/1416 713/100 |
| 8,521,667 B2 | 8/2013 | Zhu et al. | |
| 8,631,489 B2 | 1/2014 | Antonakakis et al. | |
| 8,739,243 B1 | 5/2014 | Martini | |
| 8,856,910 B1* | 10/2014 | Rostami-Hesarsorkh | H04L 63/1408 713/168 |
| 9,363,269 B2 | 6/2016 | Srinivasan | |
| 9,363,282 B1 | 6/2016 | Yu et al. | |
| 9,407,644 B1 | 8/2016 | Cheng et al. | |
| 9,419,942 B1 | 8/2016 | Buruganahalli et al. | |
| 9,596,217 B2 | 3/2017 | Martini | |
| 10,027,688 B2 | 7/2018 | Perdisci et al. | |
| 10,250,617 B1 | 4/2019 | Gardner et al. | |
| 2010/0268814 A1 | 10/2010 | Cross et al. | |
| 2012/0304244 A1 | 11/2012 | Xie | |
| 2014/0075558 A1* | 3/2014 | Ward | H04L 63/1425 726/23 |
| 2014/0157405 A1 | 6/2014 | Joll et al. | |
| 2015/0106931 A1 | 4/2015 | Mankin et al. | |
| 2015/0180892 A1 | 6/2015 | Balderas | |
| 2015/0373043 A1* | 12/2015 | Wang | G06F 21/6254 706/12 |
| 2016/0294773 A1* | 10/2016 | Yu | H04L 63/1441 |
| 2016/0359887 A1* | 12/2016 | Yadav | H04L 63/1425 |
| 2017/0318035 A1* | 11/2017 | Baughman | H04L 61/4511 |
| 2018/0063162 A1* | 3/2018 | Baughman | H04L 63/1416 |
| 2018/0069878 A1* | 3/2018 | Martini | H04L 67/02 |
| 2018/0077120 A1* | 3/2018 | Baughman | H04L 67/563 |
| 2018/0084000 A1* | 3/2018 | Baukes | H04L 63/1433 |

OTHER PUBLICATIONS

European Search Report dated Jan. 26, 2018 in connection with European Application No. 17 19I 3852.
Vanhoenshoven et al., "Detecting Malicious URLs using Machine Learning Techniques", IEEE,, Dec. 9, 2016.
Sahoo et al., "Malicious URL detection using Machine Learning: A survey", arXIV, 2019.
Dmitri Bekerman et al., Unknown Malware Detection Using Network Traffic Classification, IEEE (Year: 2015).

* cited by examiner

IDENTIFYING AND USING DNS CONTEXTUAL FLOWS

CROSS-REFERENCE TO RELATED APPLICATIONS

This application is a continuation of U.S. patent application Ser. No. 17/696,081, filed on Mar. 16, 2022, U.S. patent application Ser. No. 16/669,831, filed on Oct. 31, 2019, and U.S. patent application Ser. No. 15/285,805, filed on Oct. 5, 2016, all entitled IDENTIFYING AND USING DNS CONTEXTUAL FLOWS, by David McGrew, et al., the entire contents of which are incorporated by reference herein.

TECHNICAL FIELD

The present disclosure relates generally to computer networks, and, more particularly, to identifying and using domain name system (DNS) contextual flows to detect malicious traffic.

BACKGROUND

Malicious network traffic can take many different forms. For example, some traffic may seek to overwhelm a service by sending a large number of requests to the service. Such attacks are also sometimes known as denial of service (DoS) attacks. Other forms of malicious traffic may seek to exfiltrate sensitive information from a network, such as credit card numbers, trade secrets, and the like. Typically, such traffic is generated by a client that has been infected with malware. Thus, a further type of malicious network traffic includes network traffic that propagates the malware itself.

Intrusion Prevention Systems (IPS), firewalls, and flow monitoring systems generally attempt to detect and block malicious traffic, whenever possible. However, in recent years, the amount of encrypted network traffic has increased considerably. Notably, with the advent of transport layer security (TLS) and other security mechanisms, many websites are now encrypting even traditional webpage data. This presents certain challenges to security systems as the cleartext contents of the traffic may not be available for analysis and pattern matching is generally inapplicable to encrypted traffic.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device in a network captures domain name system (DNS) response data from a DNS response sent by a DNS service to a client in the network. The device captures session data for an encrypted session of the client. The device makes a determination that the encrypted session is malicious by using the captured DNS response data and the captured session data as input to a machine learning-based or rule-based classifier. The device performs a mediation action in response to the determination that the encrypted session is malicious.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1:
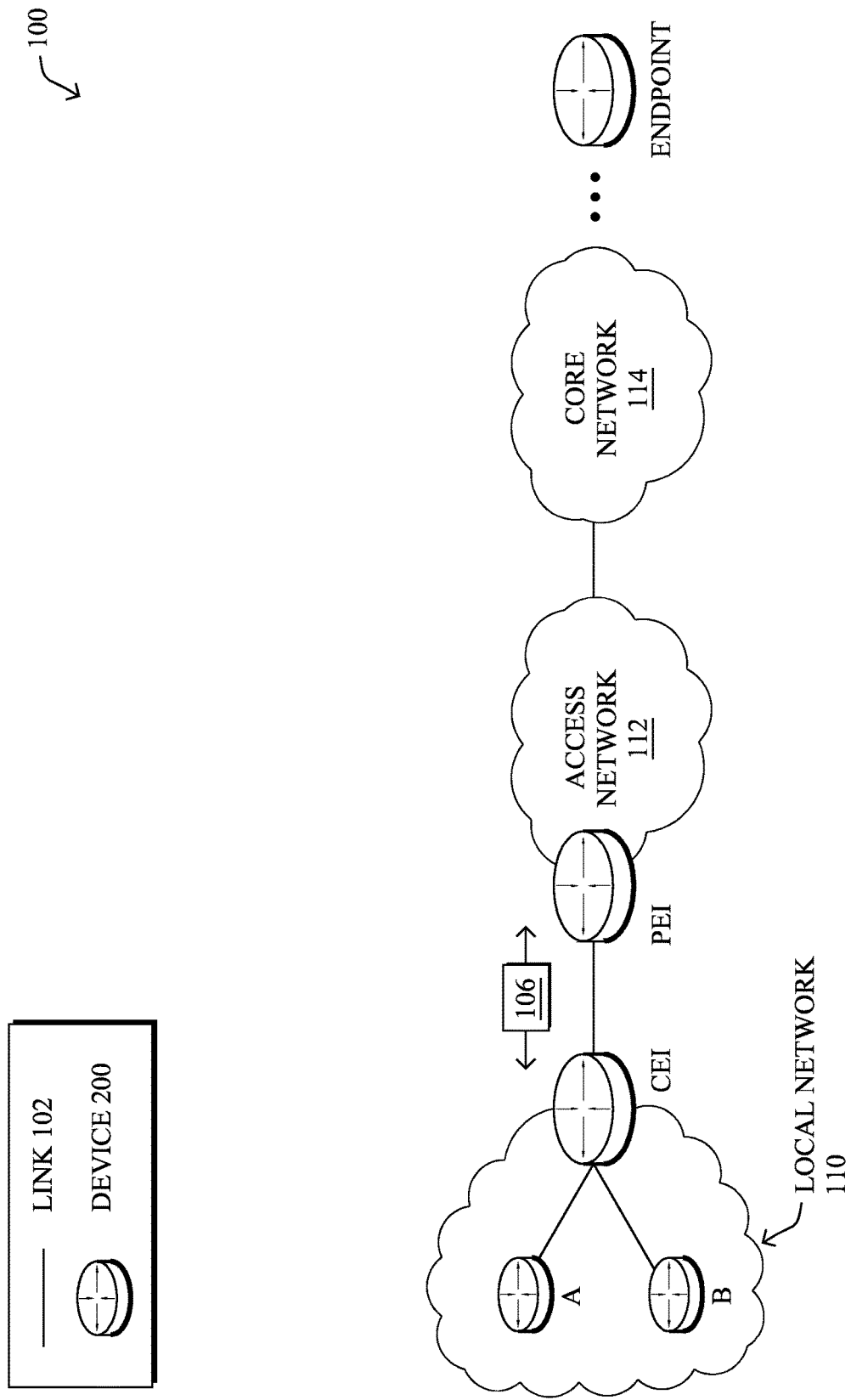
FIG. 1 illustrates an example communication network.

FIG. 1 is a schematic block diagram of an example communication network 100 illustratively comprising nodes/devices 200, such as a plurality of routers/devices interconnected by links and/or networks, as shown. For example, a customer edge (CE) router CE1 may interconnect nodes A and B on a local network 110 with a provider edge (PE) router PE1 of an access network 112. In turn, access network 112 may provide local network 110 with connectivity to a core network 114, such as the Internet.

The various nodes/devices 200 may exchange data packets 106 (e.g., traffic/messages) via communication network 100 over links 102 using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity. For example, node A in local network 110 may communicate with an endpoint node/device C (e.g., a remote server, etc.) via communication network 100.

As would be appreciated, links 102 may include any number of wired and/or wireless connections between devices. For example, node A may communicate wirelessly using a WiFi™ connection, CE1 and PE1 may communicate wirelessly using a cellular connection or via a hardwired connection (e.g., DSL, etc.), etc. In addition, while certain devices are depicted in FIG. 1, the view shown is a simplified view of communication network 100. In other words, communication network 100 may also include any number of intermediary networking devices such as, but not limited to, routers, switches, firewalls, etc., that are not shown.

In various embodiments, nodes/devices 200 may employ a secure communication mechanism, to encrypt and decrypt data packets 106. For example, nodes/devices 200 shown may use a Transport Layer Security (TLS) mechanism, such as the HTTPS protocol, to encrypt and decrypt data packets 106.

Figure 2:
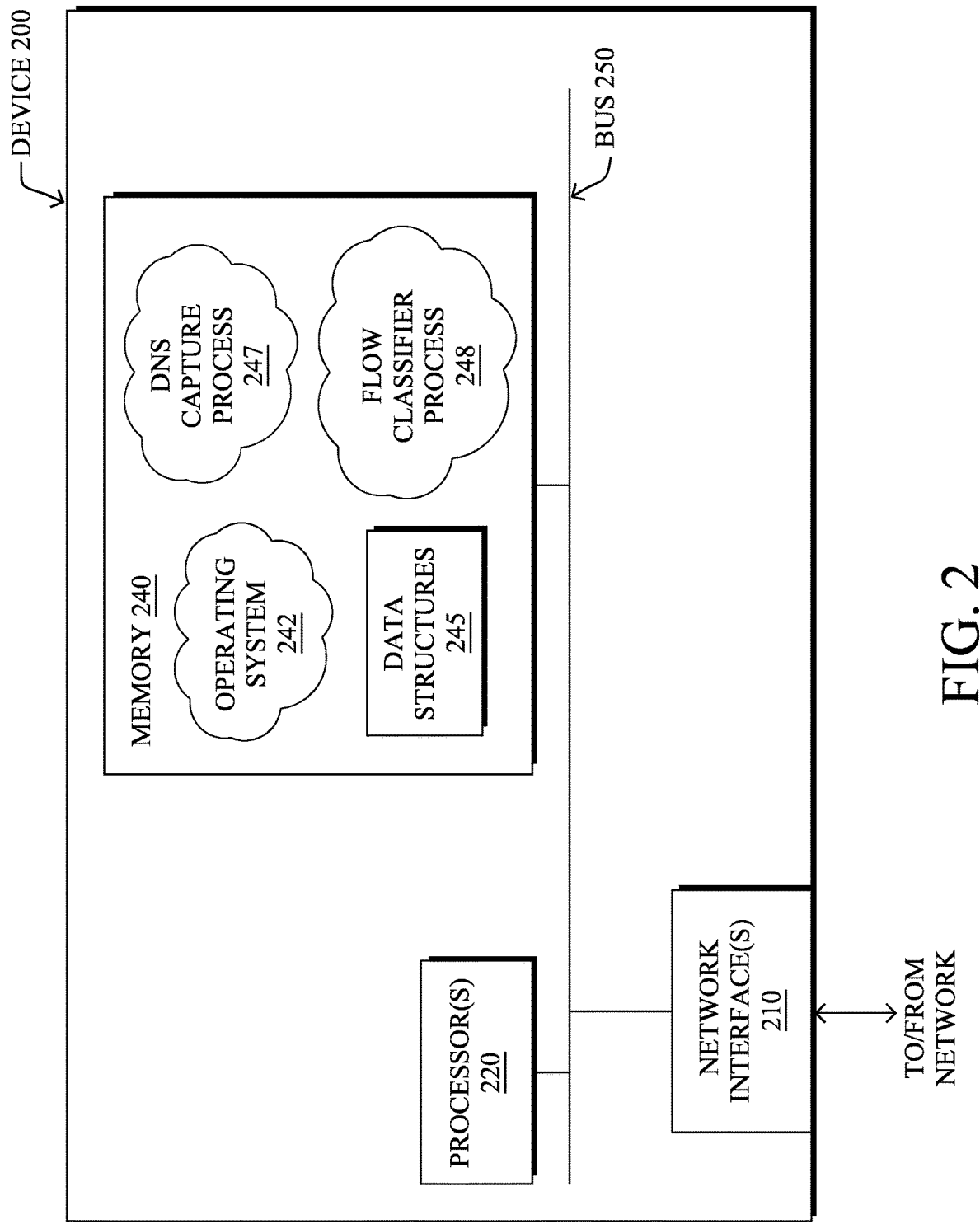
FIG. 2 illustrates an example network device/node.

FIG. 2 is a schematic block diagram of an example node/device 200 that may be used with one or more embodiments described herein, e.g., as any of the computing devices shown in FIG. 1, any other computing device that supports the operations of network 100 (e.g., switches, etc.), or any of the other devices referenced below. The device 200 may also be any other suitable type of device depending upon the type of network architecture in place. As shown, device 200 comprises one or more network interface(s) 210, one or more processor(s) 220, and a memory 240 interconnected by a system bus 250.

The network interface(s) 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interface(s) 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a domain name system (DNS) capture process 247 and, illustratively, a flow classifier process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In various embodiments, DNS capture process 247 may be configured to capture DNS-related information associated with a client in the network either directly (e.g., by intercepting DNS-traffic to or from the client) or indirectly (e.g., by receiving the information from the DNS service). For example, as described below, DNS capture process 247 may capture information included in a DNS response sent from a DNS service to a client, associate the captured DNS information with the client, and store the data for later use in data structures 245.

Flow classifier process 248 may include executable instructions that, when executed by processor(s) 220, cause device 200 to classify traffic flows. In some embodiments, flow classifier process 248 may make a determination as to whether a given traffic flow/session is malicious. For example, flow classifier process 248 may determine whether a given flow/session is related to malware (e.g., by conveying malware, is generated by malware, etc.).

In various embodiments, flow classifier process 248 may execute one or more machine learning-based or rule-based classifiers to classify traffic flows. In general, machine learning is concerned with the design and the development of techniques that receive empirical data as input (e.g., traffic data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, flow classifier process 248 can use the model M to classify new data points, such as information regarding new traffic flows in the network. Often, M is a statistical model, and the cost function is inversely proportional to the likelihood of M, given the input data.

Example machine learning techniques that flow classifier process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), or the like.

As noted above, many network monitoring and enforcement systems, such as Intrusion Prevention Systems (IPS), firewalls, and flow monitoring systems, aim to detect malicious sessions when possible. Such systems may also have difficulty assessing traffic from encrypted sessions. In some cases, an attempt may be made to decrypt the encrypted traffic, such as by using an intermediate proxy that acts as a man-in-the-middle to intercept the requisite data to decrypt the traffic. However, such approaches are often complicated by client constraints and require additional hardware to implement.

Identifying and Using DNS Contextual Flows

The techniques herein allow a network security system to obtain new information about encrypted traffic flows by identifying a DNS response that includes the address of the endpoint client that initiates an encrypted flow/session. In turn, the system may use other data in the DNS response or DNS query, along with data features observed from the encrypted flow, to determine whether or not that flow or session is malicious, and take any number of mitigation actions.

Specifically, according to one or more embodiments of the disclosure as described in detail below, a device in a network captures domain name system (DNS) response data from a DNS response sent by a DNS service to a client in the network. The device captures session data for an encrypted session of the client. The device makes a determination that the encrypted session is malicious by using the captured DNS response data and the captured session data as input to a machine learning-based or rule-based classifier. The device performs a mediation action in response to the determination that the encrypted session is malicious.

Illustratively, the techniques described herein may be performed by hardware, software, and/or firmware, such as in accordance with processes 247-248, which may include computer executable instructions executed by the processor 220 (or independent processor of interfaces 210) to perform functions relating to the techniques described herein.

Operationally, the techniques herein allow a system to obtain new information about an encrypted flow/session by identifying the DNS response that contains the address (e.g., A or AAAA record) of the endpoint that is the destination of the encrypted flow or session, where the source address of the encrypted flow is the destination address of the DNS response. In turn, the system can then use the other data in the DNS response (or DNS query) to determine whether or not that flow or session is malicious. In this case, the DNS response may be treated as part of a DNS contextual flow that includes name and time to live (TTL) information, both of which are useful in threat detection. Notably, names and TTLs are often set by an administrator of a malware server, and are often characteristic of that malware in ways that are recognizably distinct from benign traffic.

Figure 3A:
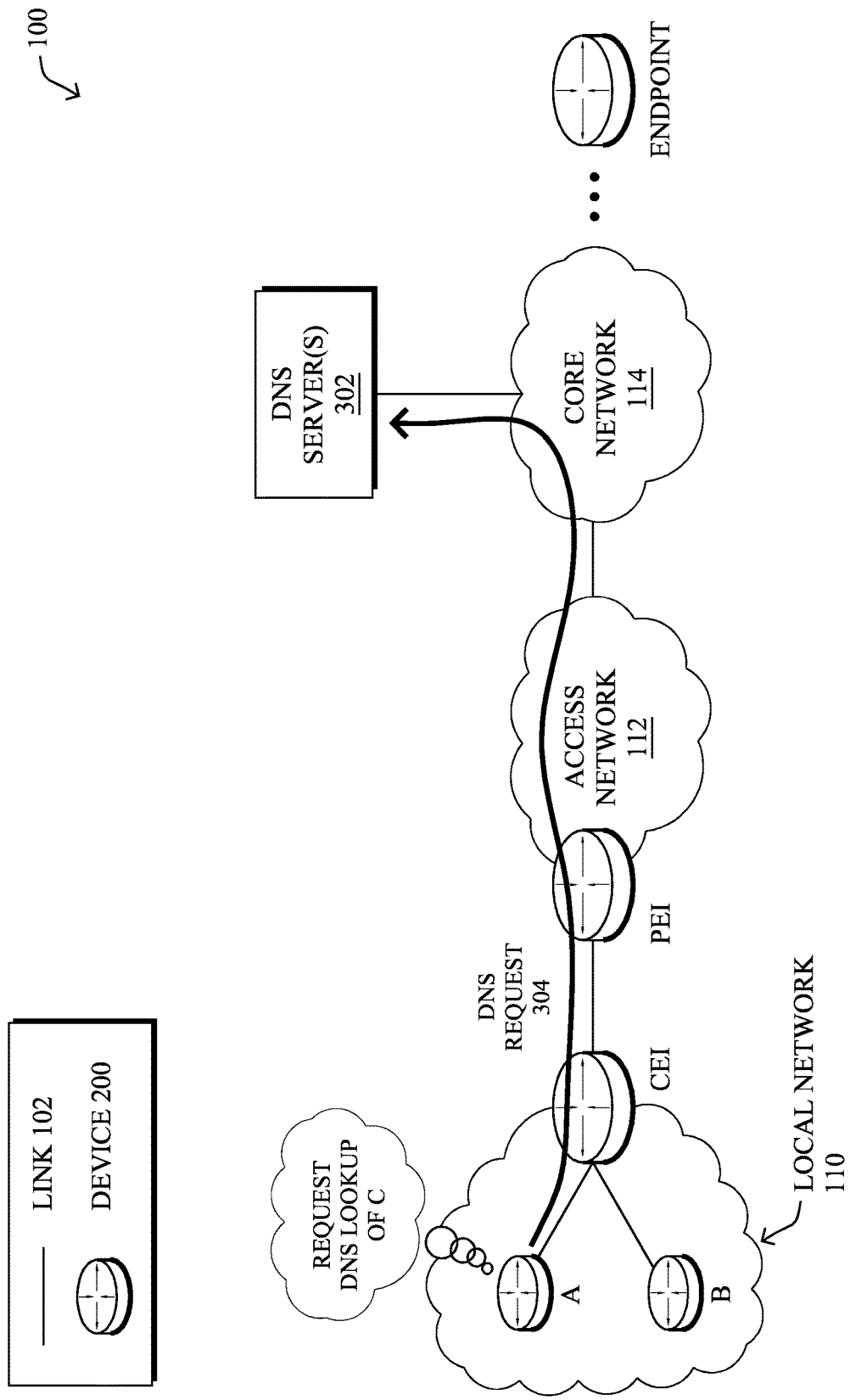
FIGS. 3A-3B illustrate examples of a device capturing domain name system (DNS) response data.
Figure 3B:
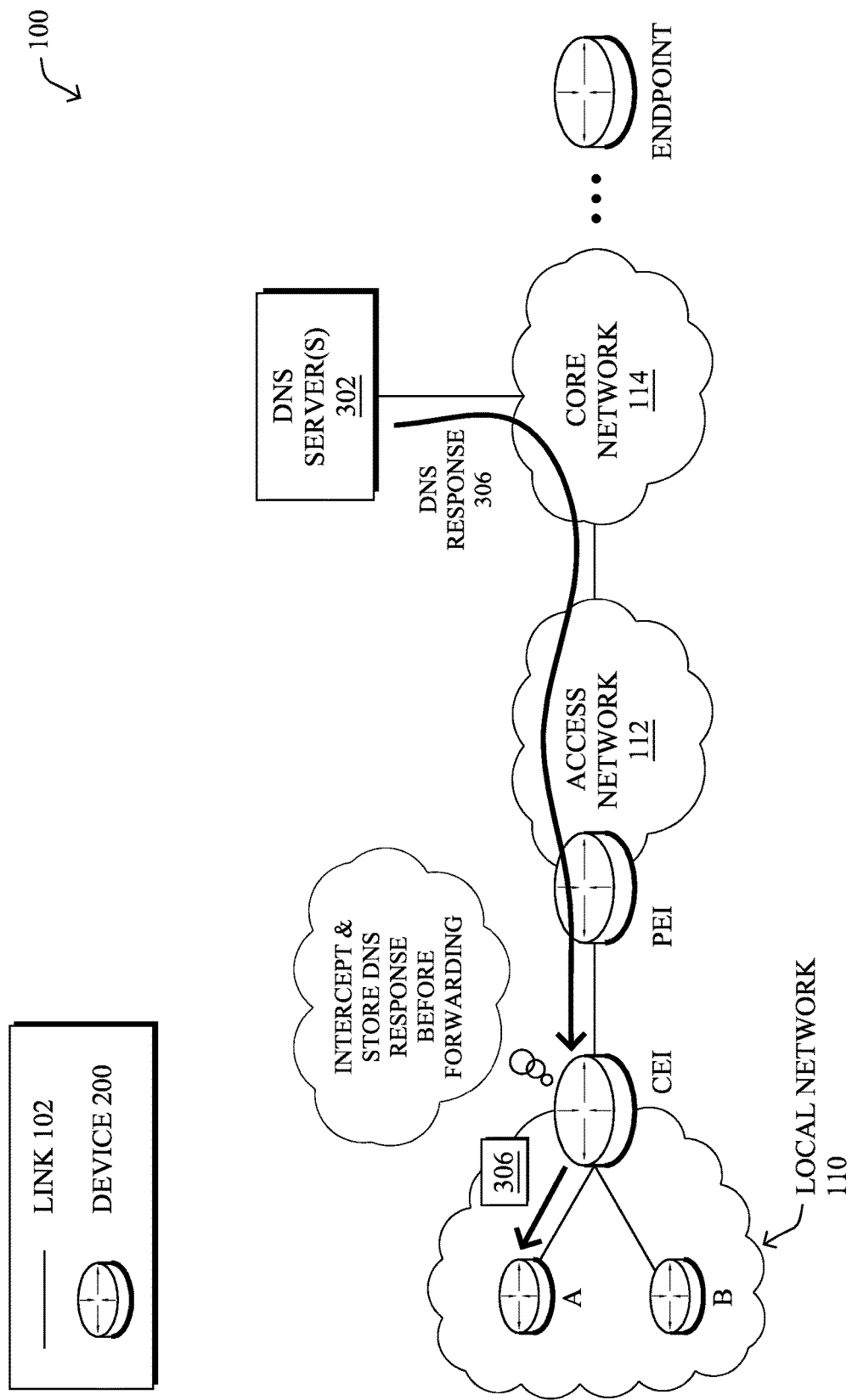

FIGS. 3A-3B illustrate examples of a device capturing domain name system (DNS) response data, according to various embodiments. In many Internet applications, a client may send a DNS query to a DNS server, to determine the network address associated with a host or domain name. In turn, the DNS server responds with the requested address information, and the client can use then uses that address in subsequent sessions. According to various embodiments, the DNS information sent to a given client may be used to enhance the analysis of any subsequent traffic flows/sessions (e.g., encrypted sessions) that involve the client. For endpoints with multiple addresses, the source address of the encrypted flow and the destination address of the DNS response may differ in some scenarios. If endpoint equivalence of those addresses can be determined by other means (e.g. by a device UUID), the techniques can still be employed.

As shown in FIG. 3A, assume that endpoint client A is to communicate with remote endpoint C which has the host name, host.example.com, and IP address w.x.y.z. To discover the IP address of endpoint C, client A may send a DNS request 304 to one of DNS server(s) 302 that are part of a DNS service.

In response to receiving DNS request 304, the DNS server 302 may return a DNS response 306 to client A. Generally, DNS response 306 may include the IPv4 address of endpoint C (e.g., an "A" record) or the IPv6 address of endpoint C (e.g., an "AAAA" record) that is mapped to the hostname of endpoint C. DNS response 306 may further include additional information about the host name of endpoint C, such as time to live (TTL) information that indicates a maximum amount of time that client A should cache the IP address of endpoint C. DNS response 306 may further include any other information typical to a DNS response.

According to various embodiments, in a network monitoring or enforcement system, the name and address observed in the DNS request/response exchange can be logically associated with the subsequent session/flow for the client. This enables any relevant information about the DNS name to be leveraged when analyzing the session/flow, and it enables weak convictions of the DNS name to be combined with weak convictions of the session/flow. It also enables the DNS and session/flow information to be analyzed together.

As shown in FIG. 3B, a device in the network may capture the DNS information exchanged between client A and DNS server 302, to enhance its analysis of subsequent traffic involving client A. For example, a flow monitoring sensor may be deployed at the edge of local network 110 (e.g., at router CE1, etc.) or elsewhere along the path between client A and other services, to observe all traffic associated with client A, including DNS traffic. In other embodiments, an Intrusion Detection System (IDS)/Intrusion Protection System (IPS), network firewall, client, or similar device may implement the techniques herein. In other embodiments, a distributed flow monitoring system may implement the techniques herein by leveraging grid communications between the monitoring system in near real-time, data reconciliation during post-processing, or even a DNS proxy, which may provide the DNS information to the flow monitoring system. Note, however, that the latter approach requires the endpoint to actually use the DNS proxy.

One approach to implementing the techniques herein would be to extend a network monitoring system so that the flow records for DNS query flows contain the query, the response code, and the address(es) provided by the DNS server. All of this information appears in the DNS response message 306, so it is sufficient to monitor those messages, and the effort of parsing DNS queries can be avoided, in some cases. For example, CE1 or another intermediate device between client A and DNS server 302 may intercept and store DNS response data from DNS response 306, before forwarding DNS response 306 on to client A. In such a way, CE1 or another flow monitoring device now has the DNS information sent to client A.

Figure 4A:
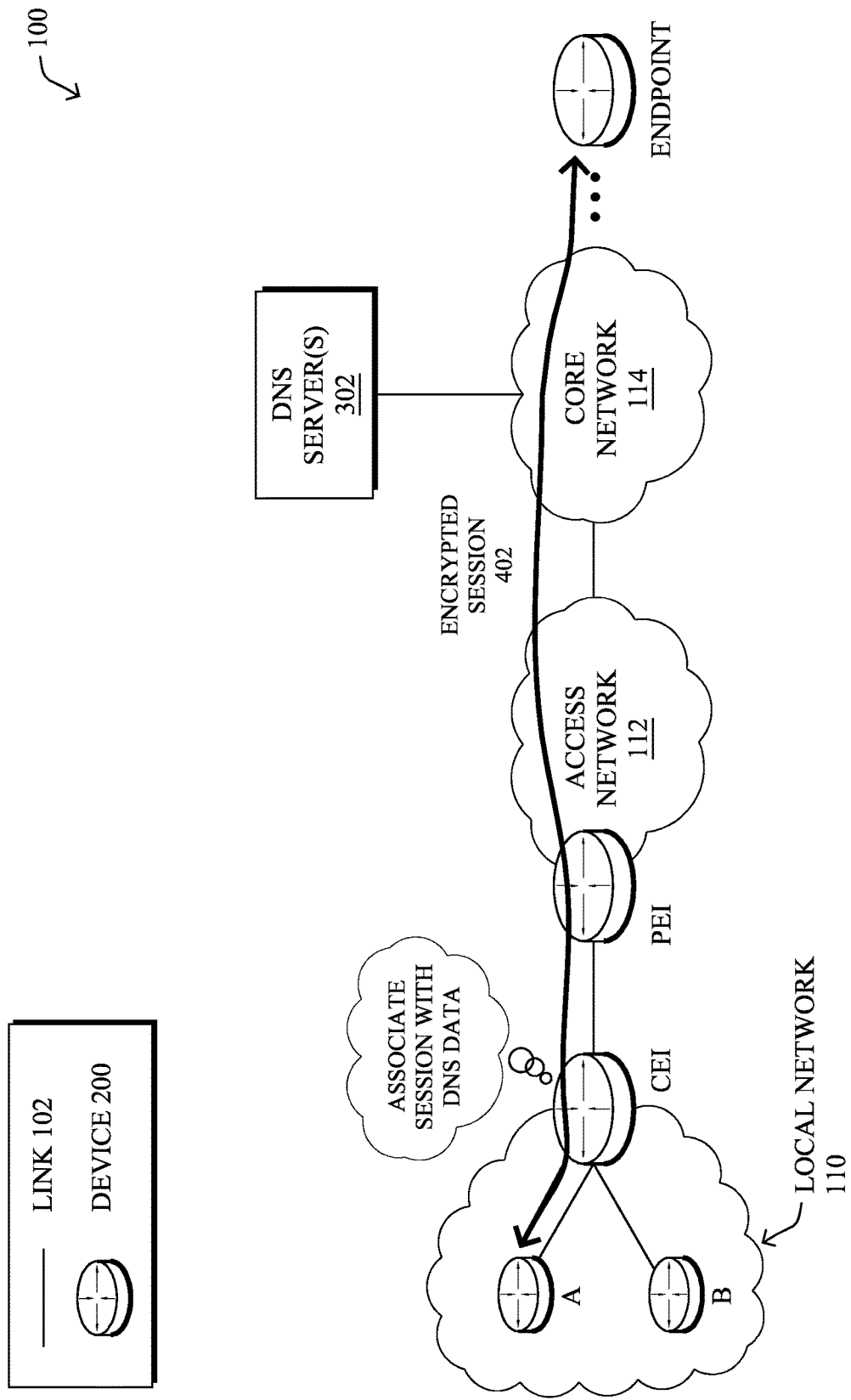
FIGS. 4A-4B illustrate examples of a device using DNS response data to analyze network traffic.
Figure 4B:
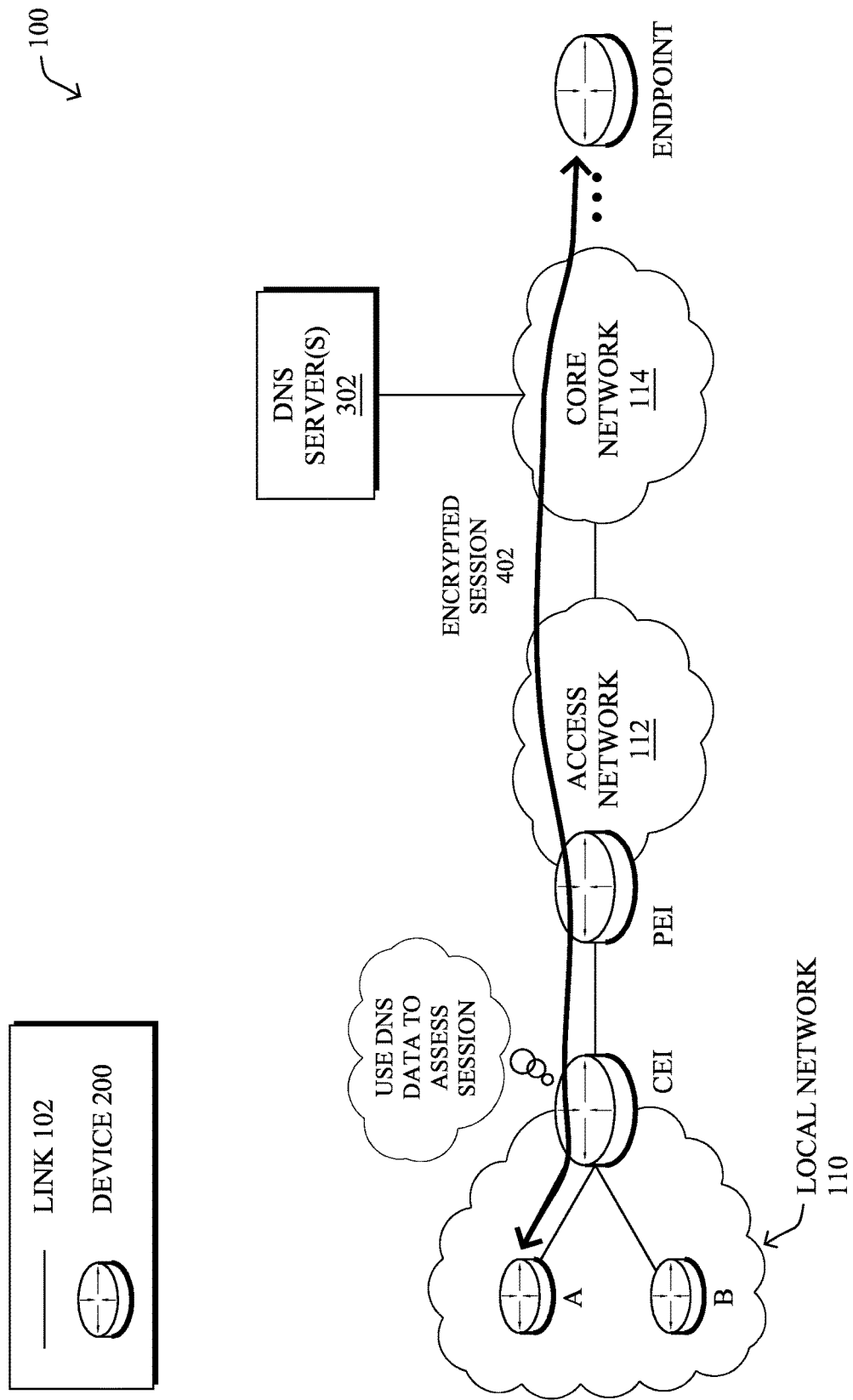

FIGS. 4A-4B illustrate examples of a device using DNS response data to analyze network traffic, according to various embodiments. As shown in FIG. 4A, once the device has the DNS response data that was addressed to client A, the device may match the DNS response data against any non-DNS traffic flows also associated with client A that use the same DNS data. The device may employ data fusion to make such an association as follows.

In one embodiment, the device may use an associative array T that takes as input an ordered pair of addresses (srcAddr, dstAddr) and returns a character string. In such a case, the device may operate as follows:

1. For each DNS response that is observed, determine the address of the DNS client (clientAddr) from the destination IP address of that packet, and the address returned as an A or AAAA record in the DNS response (responseAddr), as well as the DNS name (DNSname), then create an entry in T, indexed by (clientAddr, responseAddr), containing DNSname. If there is more than one A or AAAA record in a DNS response, then create an entry in T for each record.
2. For each non-DNS flow that is observed, determine the source address (srcAddr) and destination address (dstAddr) of that flow, then check T to see if there is an entry for (srcAddr, dstAddr). If there is, then read DNSname from that entry, and copy that data into the flow record for the non-DNS flow. If there is not, then add data to the flow record to indicate that no DNS lookup corresponding to that flow was observed.

For example, as shown in FIG. 4A, assume that client A initiates an encrypted session/flow 402 with endpoint C, subsequent to receiving DNS response 306. In such a case, CE1 or another flow monitoring device may perform a lookup to determine whether the addresses of client A and endpoint C match those from DNS response 306, to associate encrypted session 402 with the captured DNS response data from DNS response 306. Thus, CE1 or another such device may capture information regarding encrypted session 402 and associate the captured information with the corresponding DNS information. For example, the device may capture TLS metadata or other header information from encrypted session 402 and associated this information with the DNS information sent previously to client A.

As shown in FIG. 4B, by associating DNS data with other data features obtained from encrypted session 402, the monitoring device CE1 may assess whether encrypted session 402 is malicious. For example, CE1 may compare the DNS name with a SubjectAltName in the transport layer security (TLS) server certificate used in encrypted session 402, or with a Server Name Indication (SNI) TLS extension. In various embodiments, these data features can be used, along with features observed in the encrypted flow/session 402, to construct rules based on both DNS features and non-DNS features, or to use both types of features in a machine learning classifier. Further, malware may also attempt to use a different DNS server (e.g., some malware change the DNS resolver or use their own). Thus, the device may also use the captured DNS response data to detect when client A suddenly switches to using a new DNS service.

More specifically, once the device captures both the DNS information (e.g., from DNS response 306) and non-DNS information (e.g., flow information regarding encrypted flow/session 402), it may use this information in a number of different ways, to assess whether session 402 is malicious. In one embodiment, if a DNS name and information about the DNS name is available (e.g. a reputation score from a threat intelligence service such as OpenDNS Investigate), then that information can be added into the flow record for flow/session 402, to be utilized in flow analysis or stored for network forensics purposes. When network incidents are being investigated using forensics, the DNS name and reputation associated with the flow will now be available to users.

In some embodiments, CE1 or another such device may use the captured DNS data and session data as inputs to a machine learning-based or rule-based classifier configured to determine whether encrypted session 402 is malicious. Notably, such a classifier may assess flow data regarding flow/session 402 and/or other data such as the Sequence of Packet Lengths and Times (SPLT) or byte distribution (BD) of session 402. This analysis can produce a weak conviction, which is a determination that a flow is possibly malicious. In particular, traditional flow data can be used to detect potential reconnaissance or exfiltration, while SPLT or BD data can be used to detect potential malware traffic. In either case, however, further assessment of the DNS response data may reduce the number of false positives.

By way of example, let $P(N)$ denote the probability that the DNS name N is malicious, and $P(F)$ denote the probability that the flow F is malicious, as determined by the DNS reputation system and the flow analysis system, respectively. Given both of those probabilities, and the knowledge that N is associated with F, the device can better estimate the probability that the flow is malicious as $P(N)+P(F)-P(N)P(F)$. If both F and N have been weakly convicted, and thus have a probability between 0 and 1, then this estimate will combine those weak convictions and indicate a higher probability.

One approach to the analysis of DNS names is to consider each name independently, and look closely at its data features, such as the distribution of characters, the transition probability between successive characters, the number of characters, and the heuristic entropy of the name. These features can be used to distinguish between human-generated names and machine-generated ones, and the latter are commonly used in malware. This technique is well suited to detect malware, and it can be used to determine the probability estimate $P(N)$ as an alternative (or in addition to) relying on DNS reputation information.

A further approach would be for the device (e.g., CE1, etc.) to use the DNS information and flow records for session 402 to analyze both the flow and the name information at the same time. By way of example, consider the analysis of SPLT information to detect malicious traffic. A machine learning-based classifier can be trained to detect malicious traffic, by training on malicious traffic observed in sandboxes and benign traffic observed on live networks. In this case, SPLT is a data feature that is utilized by the machine learning-based classifier, which makes use of the fact that SPLT 'looks different' for benign and malicious traffic. In various embodiments, such a classifier can be extended to also use data features that are based on the DNS name associated with a flow. For instance, the data features derived from DNS names that are used to distinguish machine-generated names can be used in a classifier that also considers SPLT information. This classifier will work at least as well as the system in which names and flows are considered independently and then $P(N)$ and $P(F)$ are combined, and it potentially can detect things that a SPLT-only system cannot. Notably, if there is a particular malware type for which a combination of SPLT and DNS name features is unique, the classifier has access to the fine-grained data needed to detect that particular combination. Similarly, SPLT detection can leverage DNS reputation information, if available at time of SPLT analysis, or observations about the DNS server used (e.g. if different from what other traffic is using from this source or in general).

Note also that the system may also be able to detect certain types of network attacks that specifically target the analysis mechanism (e.g., the machine learning-based or rule-based classifier). For example, such an attack may attempt to modify DNS responses with modified TTL values, number of A or AAAA records, etc., that could adversely impact the classifier (e.g., to cause a benign flow to be flagged as malicious, etc.). In some embodiments, the analysis device (e.g., CE1, etc.) may also take into account a reputation score for the DNS server/service that supplies the DNS information (e.g., by weighting DNS responses by the level of trust of the service), thereby mitigating the impact of false DNS information on the system. In further embodiments, the device may base such a weighting on additional factors such as whether the DNS response is encrypted (e.g., using DNSCrypt, etc.) and/or signed (e.g., using DNSSEC, etc.).

Non-DNS flows that are not associated with any observed DNS response may be initiated by signaling systems such as SIP or RTCWeb, or by the use of hard-coded addresses in HTTP URLs. However, the lack of a DNS lookup may be alternatively be caused by a client that caches a previous DNS response and perhaps has joined the network before the expiration of that cache entry. Thus, the absence of an observed associated DNS lookup is not a definitive indicator that the flow is malicious, but it is useful information that can be used in a traffic classification system. Again, additional information such as SPLT detection of tunneled/ encrypted DNS traffic from that source may be a further indication of suspicious behavior.

A preliminary test was conducted using the techniques herein to implement a flow monitoring system that captures DNS information along with session information (e.g., packet lengths, times, unencrypted TLS header metadata, etc.). This information was then fed to a system that processes the enhanced flow records to identify DNS contextual flows, and then use all of the above information in a machine learning classifier. By training the classifier on malware packet captures (PCAPs) and benign traffic, it was found that using the DNS contextual flows as additional features for the classifier significantly improved accuracy, especially accuracy at a fixed false discovery rate. Such DNS contextual flows could also, in theory, improve threat detection in signature-based IPS systems like Snort or a firewall process.

Figure 5:
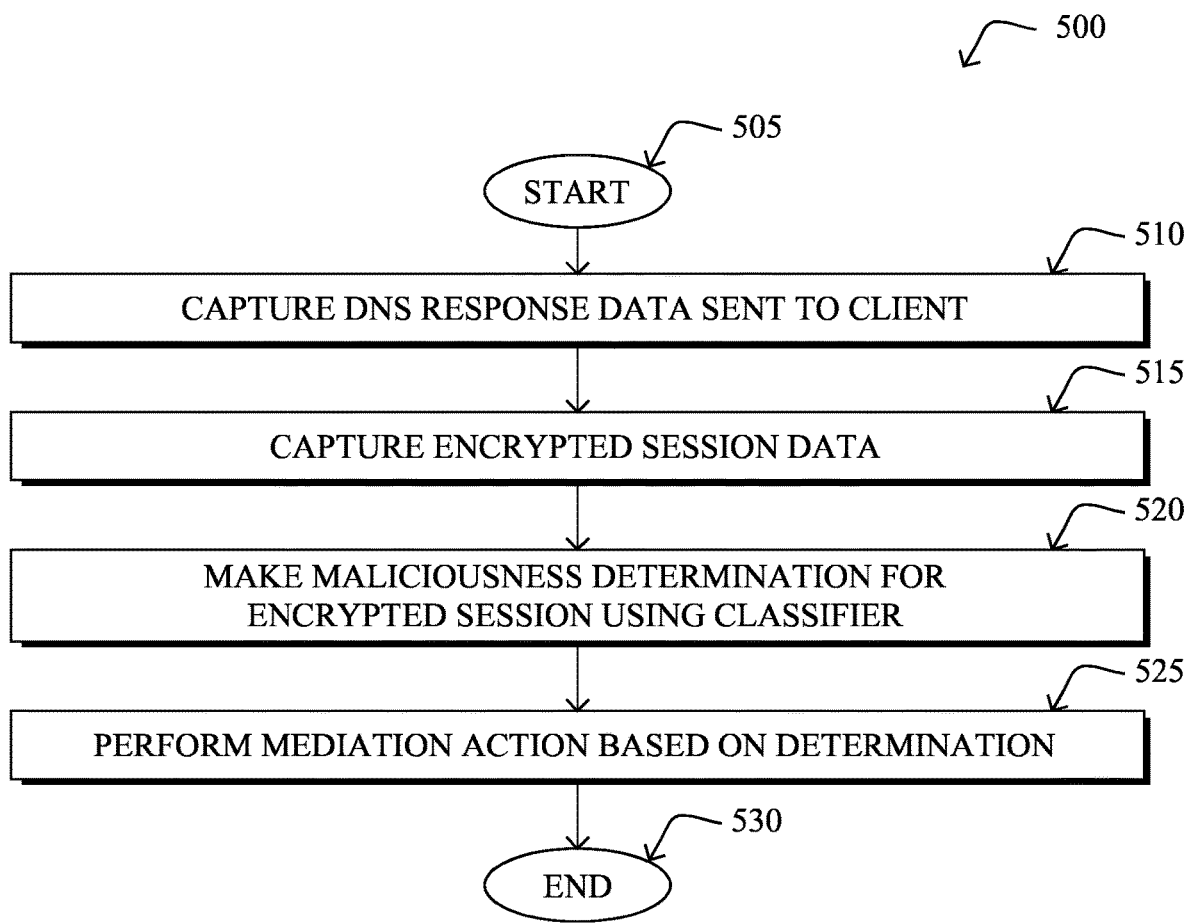
FIG. 5 illustrates an example simplified procedure for using DNS contextual flows to detect malicious traffic.

FIG. 5 illustrates an example simplified procedure for using DNS contextual flows to detect malicious traffic in accordance with one or more embodiments described herein. For example, a non-generic, specifically configured device (e.g., device 200) in a network may perform procedure 500 by executing stored instructions (e.g., processes 247-248). The procedure 500 may start at step 505, and continues to step 510, where, as described in greater detail above, the device may capture DNS response data sent from a DNS service to a client in the network. In some embodiments, the device may capture the DNS response data by intercepting the DNS response itself. For example, if the DNS response flows through the device, the device may analyze the packets of the DNS response. In other embodiments, the DNS service may provide the DNS response data to the device directly. In further embodiments, the device may also capture the DNS request data from the DNS request that prompted the DNS response, either in lieu of, or in addition to, the DNS response.

At step 515, as detailed above, the device may capture session data regarding an encrypted flow/session between the client and an endpoint node in the network. Such information may include, but is not limited to, Sequence of Packet Lengths and Times (SPLT) information, byte distribution (BD) information, TLS header metadata, certificate information, or the like. In some embodiments, similar to the DNS response data, the device may capture the session data by intercepting the session packets, if such packets flow through the device. In other embodiments, the device may work in conjunction with any number of other networking devices to capture the session/flow data.

At step 520, the device may make a determination that the encrypted session is malicious by using the captured DNS response data and the captured session data as input to a machine learning-based or rule-based classifier, as described in greater detail above. In particular, if the address information for the client in the captured DNS response data and for the session data match, the device may associate the two sets of information and use them as input to a session/flow classifier. Such a classifier may be trained to distinguish malicious traffic from benign traffic based on, e.g., training sets of information for both benign and malicious traffic flows. As noted above, preliminary testing has shown that such a classifier may benefit from the additional consideration of the corresponding DNS contextual flows, to reduce false positives.

At step 525, as detailed above, the device may perform a mediation action in response to the determination in step 520. In some embodiments, for example, the device may raise an alert, drop the traffic of the session, or block the traffic of the session, in response to determining that the traffic of the session is malicious. In further embodiments, the device may flag the client for follow-up, decrease a reputation score of the other endpoint of the session, or take any number of other mitigation actions. Procedure 500 then ends at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the use of DNS contextual flows to augment the analysis of encrypted traffic/sessions, such as by a classifier. In some cases, an intermediate networking device (e.g., a router, switch, etc.) may have access to both the encrypted flow and the DNS contextual flow, allowing the detection to be performed while the encrypted flow/session is still ongoing. This allows the system to take mitigation actions directly on the flow/session (e.g., by blocking or dropping the traffic, etc.).

While there have been shown and described illustrative embodiments that provide for the use of DNS contextual flows for the analysis of non-DNS flows/sessions, it is to be understood that various other adaptations and modifications may be made within the spirit and scope of the embodiments herein. For example, while certain embodiments are described herein with respect to using certain models for purposes of detection, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:
1. A method comprising:
    accessing, by a device in a network, domain name system (DNS) response data characterizing a DNS response containing an address of an endpoint that is a destination of an encrypted session associated with a client in the network, and captured data relating to the encrypted session, wherein the DNS response was sent by a DNS service to the client;
    correlating, by the device, the captured data relating to the encrypted session with the DNS response data;

obtaining, by the device, one or more data features of the encrypted session;

making, by the device, a determination that the encrypted session is malicious by using the DNS response data and the one or more data features of the encrypted session as input to a machine learning-based classifier, wherein the machine learning-based classifier is configured to determine whether the encrypted session is malware-related; and performing a mitigation action in response to the determination that the encrypted session is malicious.

2. The method of claim 1, wherein the determination that the encrypted session is malicious comprises a determination that the encrypted session is associated with malware or a determination that the encrypted session includes exfiltrated data.

3. The method of claim 1, wherein the mitigation action comprises at least one of: blocking traffic associated with the encrypted session or generating an alert.

4. The method of claim 1, wherein the captured data comprises at least one of: a subject alternative name of a Transport Layer Security (TLS) certificate for the encrypted session or a server name indicator of a TLS extension used in the encrypted session.

5. The method of claim 1, wherein the DNS response data comprises one or more of: a number of characters in a domain name specified in the DNS response, a number of records in the DNS response, or time to live (TTL) information included in the DNS response.

6. The method of claim 1, wherein the DNS response and traffic of the encrypted session flow through the device, and wherein the device accesses the DNS response data and the captured data by intercepting the DNS response and the traffic of the encrypted session.

7. The method of claim 1, further comprising:
applying, by the device, a weighting to the DNS response data based on the DNS service that sent the DNS response to the client.

8. The method of claim 1, further comprising:
applying, by the device, a weighting to the DNS response data based on whether the DNS response is encrypted or signed.

9. The method of claim 1, wherein the determination that the encrypted session is malicious is based in part on a history of DNS services used by the client.

10. An apparatus comprising:
one or more network interfaces configured to communicate with a network;
a processor coupled to the one or more network interfaces and configured to execute one or more processes; and
a memory configured to store a process executable by the processor, the process when executed operable to:
access domain name system (DNS) response data characterizing a DNS response containing an address of an endpoint that is a destination of an encrypted session associated with a client in the network, and captured data relating to the encrypted session, wherein the DNS response was sent by a DNS service to the client;
correlate the captured data relating to the encrypted session with the DNS response data;
obtain one or more data features of the encrypted session;
make a determination that the encrypted session is malicious by using the DNS response data and the one or more data features of the encrypted session as input to a machine learning-based classifier, wherein the machine learning-based classifier is configured to determine whether the encrypted session is malware-related; and
perform a mitigation action in response to the determination that the encrypted session is malicious.

11. The apparatus of claim 10, wherein the determination that the encrypted session is malicious comprises a determination that the encrypted session is associated with malware or a determination that the encrypted session includes exfiltrated data.

12. The apparatus of claim 10, wherein the mitigation action comprises at least one of: blocking traffic associated with the encrypted session or generating an alert.

13. The apparatus of claim 10, wherein the captured data comprises at least one of: a subject alternative name of a Transport Layer Security (TLS) certificate for the encrypted session or a server name indicator of a TLS extension used in the encrypted session.

14. The apparatus of claim 10, wherein the DNS response data comprises one or more of: a number of characters in a domain name specified in the DNS response, a number of records in the DNS response, or time to live (TTL) information included in the DNS response.

15. The apparatus of claim 10, wherein the DNS response and traffic of the encrypted session flow through the apparatus, and wherein the apparatus accesses the DNS response data and the captured data by intercepting the DNS response and the traffic of the encrypted session.

16. The apparatus of claim 10, wherein the process when executed is further operable to:
apply a weighting to the DNS response data based on the DNS service that sent the DNS response to the client.

17. The apparatus of claim 10, wherein the process when executed is further operable to:
apply a weighting to the DNS response data based on whether the DNS response is encrypted or signed.

18. The apparatus of claim 10, wherein the determination that the encrypted session is malicious is based in part on a history of DNS services used by the client.

19. A tangible, non-transitory, computer-readable medium storing program instructions that cause a device in a network to execute a process comprising:
accessing domain name system (DNS) response data characterizing a DNS response containing an address of an endpoint that is a destination of an encrypted session associated with a client in the network, and captured data relating to the encrypted session, wherein the DNS response was sent by a DNS service to the client;
correlating the captured data relating to the encrypted session with the DNS response data;
obtaining one or more data features of the encrypted session;
making a determination that the encrypted session is malicious by using the DNS response data and the one or more data features of the encrypted session as input to a machine learning-based classifier, wherein the machine learning-based classifier is configured to determine whether the encrypted session is malware-related; and
performing a mitigation action in response to the determination that the encrypted session is malicious.

20. The computer-readable medium of claim 19, wherein the determination that the encrypted session is malicious comprises a determination that the encrypted session is associated with malware or a determination that the encrypted session includes exfiltrated data.

\* \* \* \* \*